United States Patent [19]
Bove

[11] 3,806,801
[45] Apr. 23, 1974

[54] PROBE CONTACTOR HAVING BUCKLING BEAM PROBES

[75] Inventor: Ronald Bove, Wappingers Falls, N.Y.

[73] Assignee: International Business Machines Corporation, Armonk, N.Y.

[22] Filed: Dec. 26, 1972

[21] Appl. No.: 318,156

[52] U.S. Cl. ........ 324/72.5, 324/158 F, 339/108 TP
[51] Int. Cl. .......................... G01r 31/02, G01r 1/06
[58] Field of Search ............ 324/72.5, 158 P, 158 F; 339/108 TP

[56] References Cited
UNITED STATES PATENTS

| | | | |
|---|---|---|---|
| 3,676,776 | 7/1972 | Bauer et al. | 324/72.5 |
| 3,361,865 | 1/1968 | Giedd | 324/158 P X |
| 3,274,534 | 9/1966 | Shortridge | 324/72.5 X |

FOREIGN PATENTS OR APPLICATIONS

| 1,754,669 | 10/1966 | Japan | 324/158 P |
|---|---|---|---|

OTHER PUBLICATIONS

M. R. Eddy, Multiprobe Testing Device, IBM Technical Disclosure Bulletin, Vol. 12, No. 4 September 1969, pg. 539.

Primary Examiner—Alfred E. Smith
Assistant Examiner—Rolf Hille
Attorney, Agent, or Firm—Frank C. Leach, Jr.; George O. Saile

[57] ABSTRACT

A probe contactor has each of its probes formed with a length many times its cross sectional area so that the probes buckle or deflect when a predetermined axial load is applied thereto. This enables the same force to be exerted on each of a plurality of pads on a semiconductor chip regardless of the deflection of the probes produced by variations in the heights of the pads.

10 Claims, 10 Drawing Figures

PROBE CONTACTOR HAVING BUCKLING BEAM PROBES

In testing the electrical characteristics of integrated circuits connected to pads on a semiconductor chip, for example, by probes of a probe contactor engaging the pads so as to connect the pads to a tester, it is necessary to be able to have each of the pads contacted by a probe with a controlled force to prevent damage to the pad or to the chip. If the force of the probe engaging the pad exceeds that for which the pad or chip has been designed, then the pad and/or the chip can be damaged whereby a deflective chip is produced.

In one previously available probe contactor, the deflection of the probe has been directly proportional to the force applied to the end of the probe by the engagement of the probe with the pad. That is, as the force on the probe increases, the probe deflects further.

Thus, to insure sufficient space between the probes to compensate for varying deflections due to varying forces thereon, it has been necessary to space the probes sufficiently from each other to enable the probes to deflect without contacting each other. This has significantly decreased the density of the probes.

Furthermore, to insure contact between the probes of the previously available probe contactor and the pads on a semiconductor chip, a relatively large force has been required to insure the desired contact since the pads on a semiconductor chip may be of varying heights. This has sometimes resulted in the force on the pad of greatest height having a force exerted thereon greater than that for which the pad or chip has been designed so that the pad and/or the chip has been damaged. Therefore, failure of the height of the pads to fall within a relatively tight range has resulted in damage to the pads and/or the chip when testing with the previously available probe contactor.

The present invention satisfactorily solves the foregoing problems by providing a probe contactor in which each of the probes will exert a substantially constant force on each of the pads on the chip irrespective of the relative heights of the pads on the chip as long as the pads on the chip have their heights within the predetermined range in which the probes can engage the pads. The present invention accomplishes this by forming each of the probes with a length many times its cross sectional area so that each of the probes may be deemed to be a beam. Each of the probes is designed so that it will deflect over a range when a predetermined force is applied at its ends engaging the pad to axially load the probe so as to prevent any additional force, beyond the predetermined force, being applied to the pad due to engagement of the pad with the probe.

With this arrangement, each of the probes will continue to deflect when the predetermined force is axially applied thereto through engagement of the end of the probe with the pad. Thus, with the heights of the pads varying, the same force is applied to each of the pads by its contacting probe or probes because each probe will continue to deflect and not apply a further reactive force to the pad so that all of the pads are contacted with a substantially constant force if their heights are within a predetermined range.

Additionally, by allowing the probes to deflect over a range for a predetermined force, variations in the manufacture of the probes can be obtained without any damage to the pads or the chip. Accordingly, the probe contactor of the present invention enables a controlled force to be applied to each of the pads of a semiconductor chip.

In addition to being capable of having the probe continue to deflect so that it does not exert an increased force on the pad which the probe is engaging, it is necessary for each of the probes to have its deflection controlled. That is, to be able to increase the density of the probes, all of the probes must deflect or buckle in a predetermined direction. The present invention satisfactorily meets this requirement by providing means to control the deflection or buckling of each of the probes so that all of the probes buckle or deflect in a predetermined direction whereby they cannot normally engage each other.

It also has been previously suggested to utilize a probe contactor for the pads on a semiconductor chip in which the probes engage the pads at an acute angle rather than a right angle but with a substantially constant force through the use of a leaf spring acting on the probe. However, this previously suggested probe contactor has had a very low density of probes because of the deflection required and the angle at which the probes engage the pads on the chip.

The present invention satisfactorily overcomes the density problem since the probes are disposed to be substantially perpendicular to the surface of the pad that the probe engages. Thus, the probe contactor of the present invention may have a much higher probe density than the previously suggested mechanical contactor while still obtaining a substantially constant force on each of the pads.

It also has previously been suggested to utilize a substantially constant force on each of the contacts of a printed circuit board through using spring loaded probes. In this type of probe contactor, a coil spring has been disposed around the probe with one end of the spring engaging an enlarged head on the end of the probe to exert a substantially constant force on each of the contacts of the printed circuit board. However, this relatively large head and the use of the coil spring has significantly reduced the density of the probes. Thus, this type of probe contactor could not be satisfactorily used with pads on a semiconductor chip since the enlarged heads and the coil springs have required a relatively large area for each probe. Accordingly, this type of probe contactor would not solve the problem as has the probe contactor of the present invention.

In the previously available probe contactor in which the amount of deflection of the probe is directly proportional to the force applied thereto, the required movement of the chip towards the probe contactor to obtain the necessary force between the probes and the pads to insure contact therebetween has resulted in the probe engaging the metallurgy on the surface of the chip if a pad was missing. Similarly, this movement of the chip for a sufficient distance relative to the probes to obtain the desired force contact between the probes and the pads has resulted in a pad, which would not have sufficient height to be structurally connected to the substance on which the chip is to be mounted, being engaged by the probe.

Accordingly, the determination of whether a pad was missing from a chip or not of the requisite height for connection to the substrate to which the chip is joined after testing could not be made with the previously available probe contactor. Thus, the chip would pass the functionality test prior to being joined to the substrate and the absence of the pad or the failure of the pad to have the requisite height would be determined only after the chip was joined to the substrate when further tests were made to show that there was no contact between one of the pads on the chip and the cooperating conductive element on the substrate. As a result, the cost of manufacture was increased since the defective chip was not recognized as such until after being joined to the substrate.

Since the probe contactor of the present invention does not have to be moved for as great a distance to insure that there is the necessary contact with each of the pads because of the absence of any additional force between the pad and the probe after a predetermined force is applied, determination of the presence of a pad at each of the locations with the pad having the required height is readily ascertained with the probe contactor of the present invention. With the reduced movement of the chip toward the probe contactor, any pad lacking the required height for bonding to the substrate on which the chip is to be mounted will not be engaged. Similarly, the surface metallurgy will not be contacted by one of the probes of the present invention. Therefore, determination that a chip is defective because of the absence of a pad or the pad not having the required height is made prior to joining the chip to the substrate so that the cost of manufacture is decreased.

An object of this invention is to provide a unique probe contactor.

Another object of this invention is to provide a high density constant force probe contactor.

A further object of this invention is to provide a probe contactor having probes axially loaded when engaging pads of a semiconductor chip, for example.

The foregoing and other objects, features, and advantages of the invention will be more apparent from the following more particular description of the preferred embodiments of the invention, as illustrated in the accompanying drawings.

Figure 1:
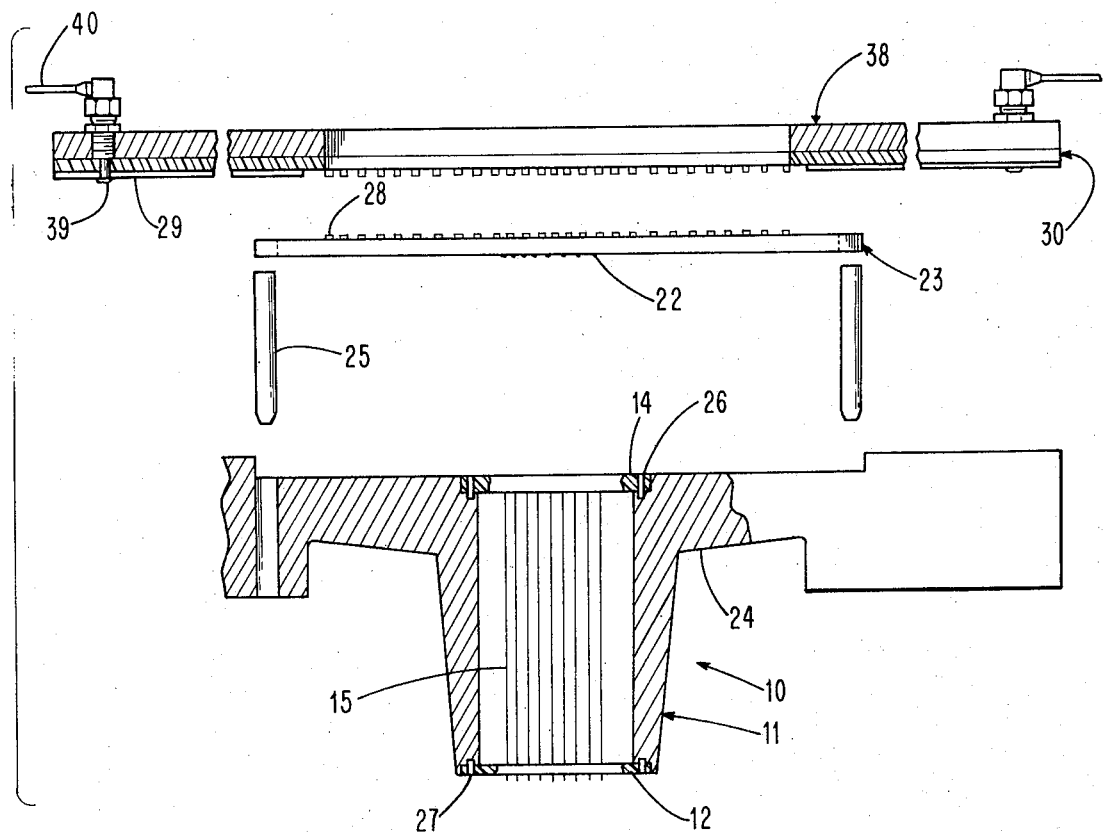
FIG. 1 is a schematic exploded elevational view, partly in section, showing the probe contactor of the present invention.

Referring to the drawings and particularly FIG. 1, there is shown a probe contactor 10 of the present invention. The probe contactor 10 includes a housing 11, which is preferably a metallic casting. The housing 11 supports a lower alignment die 12 at one end and an upper alignment die 14 at the other end. The dies 12 and 14 may be secured to the housing 11 by suitable means. An adhesive such as epoxy or screws, for example, could be employed.

Figure 4:
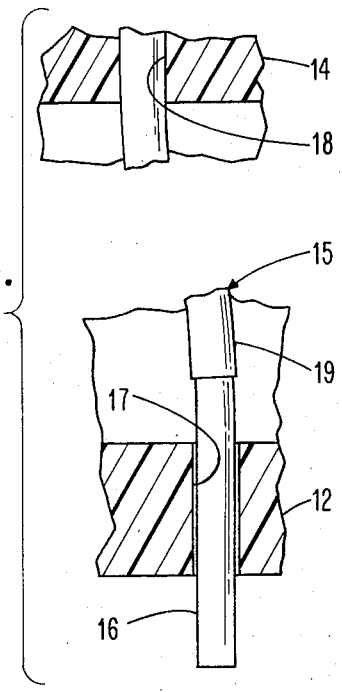
FIG. 4 is a fragmentary sectional view, partly in elevation, showing one arrangement for controlling the direction of buckling or deflection of each of the probes.
Figure 5:
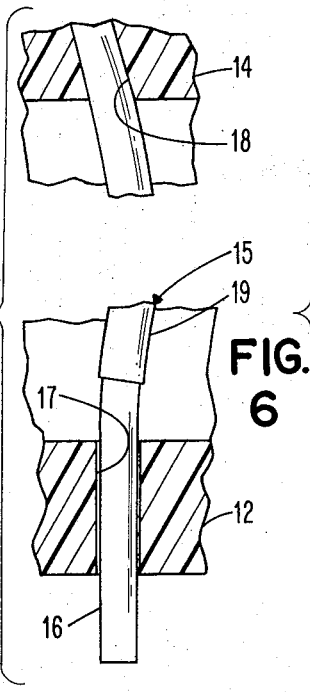
FIG. 5 is a fragmentary sectional view, partly in elevation, showing another arrangement for controlling the direction of buckling of each of the probes.
Figure 6:
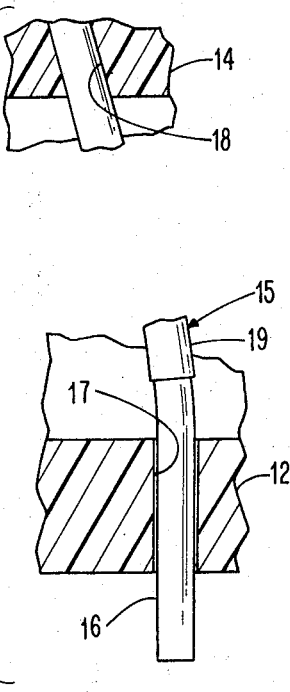
FIG. 6 is a fragmentary sectional view, partly in elevation, showing a further arrangement for controlling the direction of buckling of each of the probes.

The probe contactor 10 has a plurality of probes 15, which include electrically conductive wires 16, supported in the upper alignment die 14 and extending therefrom through the hollow housing 11 and through openings 17 in the lower alignment die 12. Each of the openings 17 is larger than the wire 16 of the cooperating probe 15 as shown in FIGS. 4–6 to allow the wire to slide relative to the die 12 when an axial load is applied to the end of the wire 16.

The alignment dies 12 and 14 are formed of a suitable electrically insulating material so that there is no short between any of the wires 16 of the probes 15 and either of the dies 12 or 14. The probe 15 has a tight fit with the upper alignment die 14 as it passes through an opening 18 therein. A suitable example of the material of the dies 12 and 14 is a plastic or an epoxy.

Figure 2:
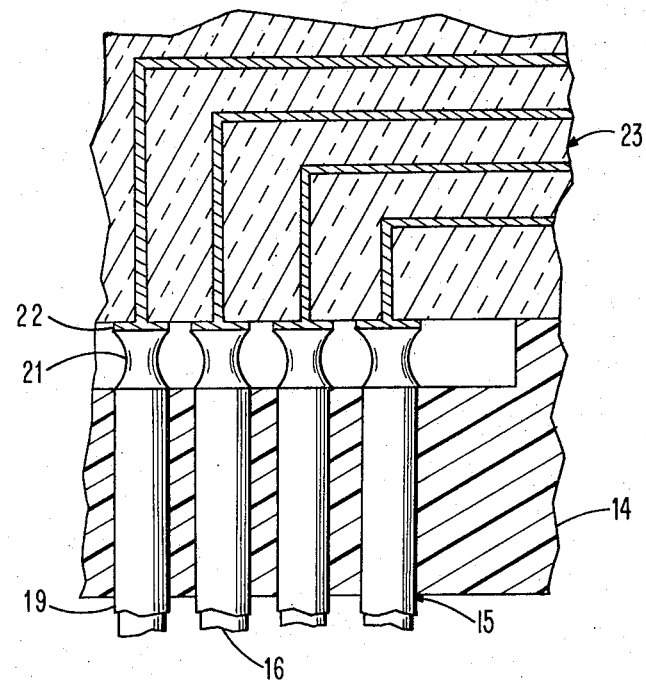
FIG. 2 is a fragmentary sectional view showing one end of a plurality of the probes being fixed to a support.

To prevent shorting of the wires 16 of the probes 15 if they should accidentally engage each other during deflection, each of the probes 15 has an electrical insulating material surrounding the wire 16. As shown in FIG. 2, a sleeve 19 of electrically insulating material is secured to the wire 16 of the probe 15 but does not extend to the upper surface of the lower alignment die 12 as shown in FIGS. 4–6.

The sleeve 19 of electrically insulating material may extend through the opening 18 in the upper alignment die 14 or end near the lower surface of the upper alignment die 14. When the sleeve 19 of electrically insulating material extends through the opening 18 in the upper alignment die 14, the opening 18 in the upper alignment die 14 must have sufficient cross section to include the thickness of the sleeve 19.

The sleeve 19 of electrically insulating material may be a coating on the wire 16 with the coating being stripped from the portion of the wire 16 just above the upper surface of the lower alignment die 12 to the lower end of the wire 16. The sleeve 19 of electrically insulating material may be deposited on the wire 16 by electrophoretic or vacuum deposition, for example. One suitable means of forming the sleeve 19 on the wire 16 is to coat the wire 16 with parylene by vacuum deposition.

As shown in FIGS. 4–6, there is no electrically insulating material on the portion of the wire 16 of the probe 15 adjacent the lower alignment die 12. This insures that there is good electrical contact of the wire 16 of the probe 15 with the pad of the semiconductor chip with which it is to engage.

It should be understood that the probe 15 is secured to the upper alignment die 14 in any suitable manner.

Thus, an adhesive may be employed. Furthermore, a layer of epoxy may be disposed on the upper surface of the upper alignment die 14 to secure the probes 15 to the upper alignment die 14.

As shown in FIG. 2, each of the wires 16 of the probes 15 has a ball 21 of reflowed solder connected to its end. The ball 21 of solder must be connected through a space transformer or the like to a tester.

Accordingly, each of the balls 21 of solder is shown in FIG. 2 as being connected to an electrically conductive element 22 of metal in a multilayered ceramic substrate 23, which is supported on a support flange 24 of the housing 11. The substrate 23 may be secured to the flange 24 by suitable means such as an adhesive, for example.

The electrically conductive elements 22 in the substrate 23 are aligned with the balls 21 of solder through utilizing dowel pins 25 to orient the substrate 23 with respect to the housing 11. The dowel pins 25 are disposed in machined openings in the adjacent surfaces of the housing 11 and the substrate 23.

The balls 21 of solder are disposed at the desired location with respect to the housing 11 through the use of dowel pins 26 (see FIG. 1) to align the upper alignment die 14 with respect to the housing 11 so that the openings 18 are set at the desired locations. Similarly, the openings 17 in the lower alignment die 12 are aligned with respect to the housing 11 by dowel pins 27, which cooperate with the lower alignment die 12 and the housing 11 through being disposed in machined openings in the adjacent surfaces of the housing 11 and the lower alignment die 12.

Each of the elements 22 is a layer of metal extending through the substrate 23 to engage a metallic pad 28 on the upper surface of the substrate 23. The pads 28 are arranged in a circle so that each of the pads 28 will engage a contact 29 on an annular shaped printed circuit board 30 when the substrate 23 is disposed between the housing 11 and the printed circuit board 30.

Figure 9:
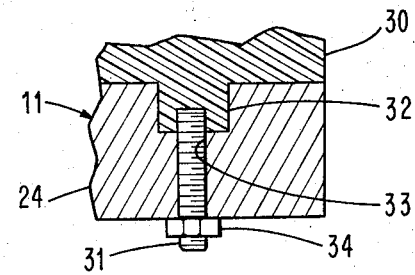
FIG. 9 is a fragmentary sectional view showing a connection between elements of the probe contactor.

The housing 11 is secured to the printed circuit board 30 by threaded dowel pins 31 (see FIG. 9), which are diametrically disposed, on downwardly extending protrusions 32 of the printed circuit board 30 passing through openings 33 in the flange 24 of the housing 11. Nuts 34 are secured to the threaded dowel pins 31 to connect the housing 11 to the printed circuit board 30.

Figure 10:
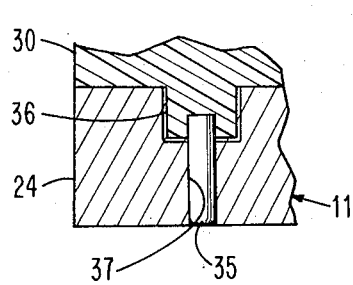
FIG. 10 is a fragmentary sectional view showing an arrangement for aligning elements of the probe contactor.

Diametrically disposed dowel pins 35 (see FIG. 10), which are spaced 90° from each of the diametrically disposed threaded dowel pins 31, extend from protrusions 36 of the printed circuit board 30 for disposition in machined openings 37 in the support flange 24 of the housing 11. This aligns the housing 11 and the substrate 23 relative to the contacts 29 on the printed circuit board 30 prior to the housing 11 being secured to the printed circuit board 30 by the threaded dowel pins 31 and the nuts 34.

The printed circuit board 30 is bonded to an annular shaped aluminum plate 38. Each of the contacts 29 is a radial finger extending from the edge of the inner surface of the printed circuit board 30 to the outer surface of the printed circuit board 30.

Each of the contacts 29 on the printed circuit board 30 makes contact by means of solder 39, for example, with an electrical conductor 40, which is connected to the aluminum plate 38. Accordingly, the aluminum plate 38 has the same number of electrical conductors 40 connected thereto as the number of the contacts 29 on the printed circuit board 30 and the number of the probes 15.

Accordingly, electrical power can be supplied from a tester through each of the conductors 40 to the connected contact 29 of the printed circuit board 30 and then through the element 22 of the substrate 23 to the wire 16 of the probe 15. Thus, each of the probes 15 can be selectively powered as desired.

Figure 8:
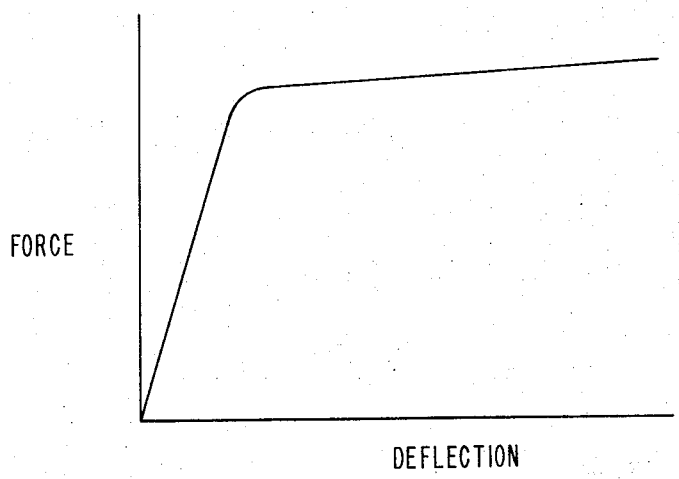
FIG. 8 is a diagram for showing the relationship between force and deflection of an axially loaded probe of the probe contactor of the present invention.

The wire 16 of each of the probes 15 is formed of a suitable material, which will continue to deflect over a predetermined range when a predetermined force is axially applied thereto. As shown in FIG. 8, the predetermined force, after a minimum predetermined force has been reached, is substantially the same irrespective of the deflection of the wire 16 of the probe 15. Thus, a substantial deflection of the probe 15 can occur without any increase in the force applied against the pad of the semiconductor chip which is being engaged by the probe 15. Suitable examples of the material of the wire 16 of the probe 15 include BeNi, BeCu, tungsten, an electrical contact alloy sold under the trademark Paliney by J. M. New Company, Bloomfield, Conn. and an electrical contact alloy sold under the trademark Niborium "B" by Niborium Industries, Inc., Providence, R.I.

The wire 16 of the probe 15 is designed in accordance with the formula, $F = (3\pi)^2 E I/L^2$ where $F$ is an axial load on the end of the wire 16 which will cause buckling of the wire 16, $E$ is the modulus of elasticity of the material of the wire 16 of the probe 15, $I$ is the least moment of inertia of the wire 16 of the probe 15, and $L$ is the length of the wire 16. If the wire 16 is a solid rod having a circular cross section, $I = \pi D^4/64$ where D is the diameter of the wire 16.

Because the sleeve 19 has a thickness of only about one-fortieth of the diameter of the wire 16 and the modulus of elasticity of the material of the sleeve 19 is very low in comparison with the elasticity of the material of the wire 16, the effect of the sleeve 19 of insulating material on the bending or buckling of the probe 15 can be ignored. This is why it need not be considered in the formula.

By selecting the desired force which is to be applied to the pad and will cause buckling of the wire 16 and with E known because of the selection of the material of the wire 16 of the probe 15 and D known because of the area of the wire 16, only L is unknown in the formula. As a result, the required length of the wire 16 of the probe 15 can be readily ascertained. Thus, by controlling the length of the wire 16 relative to its area, a predetermined and selected force is applied to the pad of the semiconductor chip and no greater force is exerted on the pad because of the deflection of the wire 16 of the probe 15 due to the bending or buckling thereof because of the axially applied force.

As an example, if the wire 16 is formed of Paliney so as to have a modulus of elasticity of $17 \times 10^6$ pounds per square inch, the diameter of the wire is 4 mils, and the predetermined load to be applied axially on the end of the wire 16 is 7 grams, then the length of the wire is 600 mils.

While the wire 16 of the probe 15 has been described as having a circular cross section, it should be understood that the cross sectional area of the wire 16 of the probe 15 may have any other shape. Thus, it could be rectangular or square, for example.

While the wire 16 of the probe 15 has been shown and described as having the ball 21 of reflowed solder provide the connection between the end of the wire 16 of the probe 15 and the metal conductive element 22 in the substrate 23 so that the end of the wire 16 of the probe 15 is rigid against axial movement, it should be understood that other suitable connections may be employed. For example, a bead of conductive epoxy may be used to join the wire 16 of the probe 15 to the metal conductive element 22 in the substrate 23 to prevent axial movement of the end of the wire 16.

Figure 3:
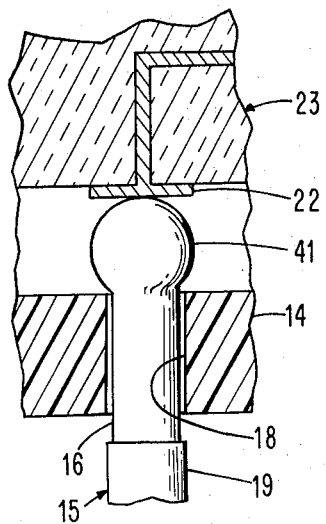
FIG. 3 is a fragmentary sectional view, partly in elevation, showing another arrangement for mounting the end of the probe to prevent axial movement thereof and to provide interconnection when an axial load is applied thereto.

Furthermore, instead of forming a structural connection between the metal conductive element 22 in the substrate 23 and the wire 16 of the probe 15, the ball 21 of solder could be replaced by enlarging the end of the wire 16 of the probe 15 so that it is a ball 41 and forming the opening 18 in the upper alignment die with a clearance as shown in FIG. 3. This arrangement, which has the sleeve 19 end prior to the lower surface of the upper alignment die 14, would result in electrical contact between the wire 16 and the conductive element 22 in the substrate 23, but there would not be a solid connection of the conductive element 22 to the enlarged end of the wire 16. As a result, the end of the wire 16 of the probe 15 would be forced against the element 22 making an electrical connection and the probe 15 would continue to buckle when an axial load is applied thereto, but this would enable easy replacement of any of the wires 16 if they were to break accidentally. That is, it would only be necessary to disconnect the substrate 23 from the housing 11.

It should be understood that the opening 18 in the upper alignment die 14 is slightly larger than the wire 16 for the probe 15 to provide a clearance therebetween to insure that the enlarged end of the wire 16 always engages the electrically conductive element 22 in the substrate 23 when an axial load is applied to the other end of the wire 16 by its engagement with a pad on a semiconductor chip, for example. Without this sliding capability of the wire 16 relative to the upper alignment die 14, the possibility could exist that manufacturing tolerances would cause the enlarged end of the wire 16 to be slightly spaced from the electrically conductive element 22 in the substrate 23. Thus, this possibility is eliminated while still preventing axial movement of the wire 16 when an axial load is applied thereto by engagement of the wire 16 with the pad on the semiconductor chip.

The direction of buckling of each of the wires 16 of the probes 15 must be controlled to have the high density of the probes 15. One means for controlling the direction of buckling is to offset the opening 17 in the lower alignment die 12 relative to the corresponding opening 18 in the upper alignment die 14 for the wire 16 of the probe 15. As shown in FIG. 4, this offset causes each of the probes 15 to buckle in a desired location so that there is no interference between the probes 15.

Another arrangement for controlling the direction of buckling of the wire 16 of the probes 15 is shown in FIG. 5. In this arrangement, the opening 18 in the upper alignment die 14 is disposed at an angle to the axis of the corresponding opening 17 in the lower alignment die 12 so as to slant the longitudinal axis of the wire 16 adjacent the upper alignment die 14. This slanting of the end of the wire 16 can be accomplished, for example, through forming the opening 18 at an angle to the vertical as shown in FIG. 5.

Another arrangement for controlling the direction of buckling or deflection of the wire 16 of the probe 15 is to employ the offset of FIG. 4 in combination with the slanted opening of FIG. 5. This arrangement is shown in FIG. 6 wherein the opening 17 in the lower alignment die 12 is offset with respect to the opening 18 in the upper alignment die 14 and the axis of the opening 18 in the upper alignment die 14 is at an angle to the axis of the opening 17 in the lower alignment die 12. It should be understood that the offset of the opening 17 could be in the opposite direction to that shown in FIG. 6 so that the opening 17 would be away from the direction in which the opening 18 slants.

The offset of the opening 17 in the lower alignment die 12 with respect to the opening 18 in the upper alignment die 14 is about 10 mils. The clearance between the opening 17 in the lower alignment die 12 and the wire 16 is between 0.03 and 0.7 mil. The thickness of each of the lower alignment die 12 and the upper alignment die 14 is between 20 and 40 mils.

The wire 16 protrudes about 12 mils beyond the lower surface of the lower alignment die 12. The sleeve 19 of the electrically insulating material terminates about 10 mils above the upper surface of the lower alignment die 12.

Figure 7:
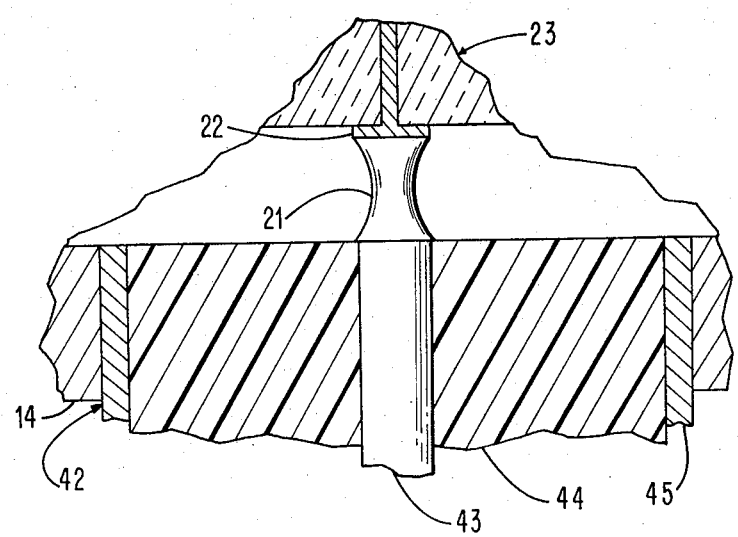
FIG. 7 is a fragmentary sectional view showing a modified probe utilized for AC testing.

While the probe contactor of the present invention may be utilized for both DC and AC testing, there may be some instances in which it would be desired to have AC testing of devices in which a high density of the probes 15 is not required but a very tightly matched impedance between the probes is needed. Accordingly, there is shown a modification of the invention in FIG. 7 in which the probe 15 is replaced by a probe 42.

Each of the probes 42 includes a center conductor 43, which is a first conductive wire, surrounded by a dielectric material 44. A metallic shield 45, which is a second conductive wire, is disposed around the dielectric material 44.

The central conductor 43 could be formed of tungsten, for example, with the dielectric material 44 being Teflon and the metallic shield 45 being copper. Since the conductor 43 would have a diameter of 4 mils, the dielectric material 44 would be an annular member having a diameter of 40 mils, and the shield 45 would be a ring having a thickness of 1 mil, the dielectric material 44 and the shield 45 cannot be ignored in determining the length of the probe 42 to have the desired force applied to the electrical contact with which the conductor 43 would engage. Both the shield 45 and the dielectric material 44 would terminate prior to the upper surface of the lower alignment die 12, which is formed of an insulating material, in the same manner as the sleeve 19 of the probe 15 terminates.

The upper alignment die 14 would be formed of a suitable electrically conductive material so that the shield 45 of each of the probes 42 would be grounded thereon. This would provide a matched impedance between the probes 42 to enable more stringent AC requirements to be met. A single wire would extend from the upper alignment die 14 to the tester.

While the present invention has shown and described the probes 15 making contact to a tester through the substrate 23 and the printed circuit board 30, it should be understood that any other suitable means for fanning out the connections to the probes 15 could be employed. As an example, the printed circuit board 30 could be replaced by cantilevered beams, for example. Similarly, instead of using the substrate 23 as the space transformer, a printed circuit board could be employed.

While the present invention has described the probes of the probe contactor of the present invention as being utilized with the pads of a semiconductor chip, it should be understood that the probes may be utilized with any type of structure in which it is desired to have a substantially constant force exerted on electrically conductive members. Thus, the probe contactor of the present invention may be readily employed with engineering change pads of a multilayered ceramic substrate, for example.

An advantage of this invention is that less area is required for a probe in comparison with previously available probes while still producing a constant force on the pad for different deflections in a predetermined deflection range. Another advantage of this invention is that it obtains good contact between the probe and the pad without damage to the pad or its support structure. A further advantage of this invention is that there is no stringent requirement for the straightness of the wires of the probes. Still another advantage of this invention is that it reduces the manufacturing cost of semiconductor chips.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An electrical contactor including:
a plurality of probes;
each of said probes including a first electrically conductive wire formed of a flexible material and having a length many times its cross sectional area;
each of said wires extending substantially axially for its entire length when not subjected to an axial load;
means to prevent one end of each of said wires from moving axially beyond a predetermined position when an axial load is applied to its other end;
means to slidably support said probe adjacent its other end to allow said probe to flex and slide when its other end has an axial load applied thereto so as to buckle between its ends;
each of said wires having its other end extend beyond said slidably support means to have the axial load applied thereto;
each of said wires buckling throughout a predetermined range when a predetermined axial load is applied thereto;
each of said wires having its length selected in accordance with the formula $L = 3\pi(EI/F)^{1/2}$ where $L$ is the length of each of said wires, $I$ is the least moment of inertia of said wire, $E$ is the modulus of elasticity of the material of each of said wires, and $F$ is the predetermined axial load to which said wire is to be subjected when applied to its other end to cause buckling throughout the predetermined range;
means to control the direction of buckling of each of said wires so that each of said wires buckles in a predetermined direction;
and means to supply electrical power to each of said wires.

2. The contactor according to claim 1 including electrical insulating means to prevent each of said wires from engaging any of the other of said wires in the area in which said probes buckle.

3. The contactor according to claim 2 in which said electrical insulating means includes electrical insulating means on each of said wires.

4. An electrical contactor including:
a plurality of probes;
each of said probes including a first electrically conductive wire formed of a flexible material and having a length many times its cross sectional area;
each of said wires extending substantially axially for its entire length when not subjected to an axial load;
means to prevent one end of each of said wires from moving axially beyond a predetermined position when an axial load is applied to its other end;
means to slidably support said probe adjacent its other end to allow said probe to flex and slide when its other end has an axial load applied thereto so as to buckle between its ends;
each of said wires having its other end extend beyond said slidably support means to have the axial load applied thereto;
each of said wires buckling throughout a predetermined range when a predetermined axial load is applied thereto;
means to control the direction of buckling of each of said wires so that each of said wires buckles in a predetermined direction;
means to supply electrical power to each of said wires;
a housing surrounding said probes;
said slidably support means including a first member supported by said housing and having a plurality of openings, each of said openings having one of said wires extending therethrough;
said preventing means including:
a second member supported by said housing in spaced relation to said first member and having a plurality of openings, each of said openings having one of said wires extending therethrough;

and means cooperating with the one end of said wire extending through said opening in said second member to prevent axial movement of the one end of said wire beyond the predetermined position;
and said control means comprises means in at least one of said first and second members cooperating with each of said wires to cause each of said wires to have a slight buckle in the predetermined direction when not subjected to an axial load.

5. The contactor according to claim 4 in which said control means comprises each of said openings in said first member for each of said wires being disposed out of axial alignment with said corresponding opening in said second member for the same wire.

6. The contactor according to claim 5 in which said control means comprises means in said second member to dispose the longitudinal axis of each of said wires adjacent to said second member at an angle to the axis of the opening in said first member.

7. The contactor according to claim 4 in which said control means comprises means in said second member to dispose the longitudinal axis of each of said wires adjacent to said second member at an angle to the axis of the opening in said first member.

8. The contactor according to claim 4 in which said cooperating means includes means to fixedly secure said wire to a fixed electrically conductive element.

9. The contactor according to claim 4 in which said supply means supplies power to said wire through said cooperating means.

10. The contactor according to claim 1 in which:
each of said probes includes:
  a second electrically conductive wire disposed in spaced relation to said first wire;
  and electrical insulating means disposed between said first and second wires of each of said probes;

each of said second wires and said electrical insulating means terminates prior to said slidably support means;

and means to connect said second wires of all of said probes to each other.

* * * * *